United States Patent [19]

Lin

[11] Patent Number: 5,319,638

[45] Date of Patent: Jun. 7, 1994

[54] LINK-BY-LINK CONGESTION CONTROL FOR PACKET TRANSMISSION SYSTEMS

[75] Inventor: Huai-An Lin, Scotch Plains, N.J.

[73] Assignee: Bell Communications Research, Inc., Livingston, N.J.

[21] Appl. No.: 758,734

[22] Filed: Sep. 12, 1991

[51] Int. Cl.$^5$ .................... H04L 12/56; H04J 3/22
[52] U.S. Cl. ................................ 370/60; 370/84; 370/94.1
[58] Field of Search .................. 370/60, 60.1, 94.1, 370/94.2, 94.3, 84, 79, 17; 340/825.02

[56] References Cited

U.S. PATENT DOCUMENTS

| | | | |
|---|---|---|---|
| 4,825,208 | 4/1989 | Mueller et al. | 340/825.02 |
| 5,115,429 | 5/1992 | Hluchyj et al. | 370/84 |
| 5,119,372 | 6/1992 | Verbeek | 370/94.1 |
| 5,140,584 | 8/1992 | Suzuki | 370/94.1 |

OTHER PUBLICATIONS

M. W. Beckner et al., "A protocol and prototype for broadband subscriber access to ISDNs," *Proceedings of the IEEE International Switching Symposium*, Mar. 1987, pp. 462–469.

A. Bhargava et al., "Performance comparison of error control schemes in high-speed computer communication networks," *IEEE Journal on Selected Areas in Communication*, Dec. 1988, vol. 6, No. 9, pp. 1565–1575.

D. R. Cheriton, "Sirpent: A high-performance internetworking approach," *Proceedings of the ACM SIGCOMM '89 Symposium on Communications Architectures and Protocols*, Sep. 1989, pp. 158–169.

D.-M. Chiu et al., "Analysis of increase/decrease algorithms for congestion avoidance in computer networks," Computer Networks and ISDN Systems, Jul. 1989, vol. 16, No. 6, pp. 1–14.

D. D. Clark, Window and Acknowledgement Strategy in TCP, 1982, DARPA Network Information Center, RFC-813, pp. 1–22.

D. D. Clark et al., NETBLT: A Bulk Data Transfer Protocol, Mar. 1987, DARPA Nework Information Center, RFC 998, pp. 1–21.

G. G. Finn, "A connectionless congestion control algorithm," *ACM Computer communications Review*, Oct. 1989, vol. 19, No. 5, pp. 12–31.

E. L. Hahne et al., "Improving the fairness of distributed-queue-dual-bus networks," manuscript submitted to INFOCOM90, pp. 175–184.

Z. Haas et al., "A case for packet-switching in high-performance wide-area networks," *Proceedings of the ACM SIGCOMM '87 Workshop on Frontiers in Computer Communications Technology*, Aug. 1987, pp. 402–409.

V. Jacobson, "Congestion avoidance and control," *Proceedings of the ACM SIGCOMM '88 Symposium on Communications Architectures and Protocols*, Aug. 1988, pp. 314–329.

R. Jain et al., "Congestion avoidance in computer networks with a connectionless network layer", Innovations in Internetworking, 1988, C. Partridge (ed.), Artech House, Inc., pp. 140–156.

(List continued on next page.)

*Primary Examiner*—Douglas W. Olms
*Assistant Examiner*—Hassan Kizou
*Attorney, Agent, or Firm*—Leonard Charles Suchyta; James W. Falk

[57] ABSTRACT

A packet transmission system includes a mechanism for controling congestion (30, FIG. 2) in the transmission system by comparing, at each switching node of the system (52, FIG. 5), the traffic load at that node and the traffic loads at all immediately neighboring switching nodes. Such traffic loads can be measured by node buffer utilization, either discretely or continuously, and loading information exchanged by the use of messages between the switching nodes (42, 54). The packet transmission speed between any two adjacent switching nodes is then adjusted (47, 62) in response to the relative traffic loads so as to reduce the traffic incoming to the more congested node. The transmission speed is never reduced to zero, however, to insure that a mechanism remains in place to relieve congestion at every transmitting switching node.

11 Claims, 3 Drawing Sheets

SWITCHING NODE

OTHER PUBLICATIONS

K. Khalil et al., "A fair distributed queue dual bus access method," *Proceedings of the 14th Conference on Local Computer Networks, Oct. 1989, pp. 180–188.*

P. Martini, "Fairness issues of the DQDB protocol," *Proceedings of the 14th Conference on Local Computer Networks*, Oct. 1989, pp. 160–170.

J. Nagle, "Congestion control in IP/TCP Internetworks," *ACM SIGCOMM Computer Communication Review*, Oct. 1984, vol. 14, No. 4, pp. 11–17.

J. Ngai et al., "A framework for adaptive routing in multi-computer networks," *Proceedings of the 1989 ACM Symposium on Parallel Algorithms and Architectures*, Jun. 1989, pp. 1–9.

J. H. Saltzer et al., "End-to-end arguments in system design," *ACM Transactions on Computer Systems*, Nov. 1984, vol. 2, No. 4, pp. 277–288.

J. Turner, "Design of an integrated services packet network," *IEEE Journal on Selected Areas in Communications*, Nov. 1986, vol. SAC-4, No. 8, pp. 1373–1380.

O. Ulusoy et al., "Dynamic congestion control in interconnected computer networks," *Proceedings of the 13th IEEE Conference on Local Computer Networks*, Oct. 1988, pp. 92–98.

Y. Yaw et al., "Analysis on access fairness and a technique to extend distance for 802.6," *Proceeding of the 14th Conference on Local Computer Networks*, Oct. 1989, pp. 171–179.

L. Zhang, "A new architecture for packet switching network protocols," 1989, MIT Ph.D. Thesis.

S. J. Golestani, "Congestion-Free Communication in High-Speed Packet Networks," IEEE Trans on Comm, vol. 39, No. 12, Dec. 1991, pp. 1802–1812.

F. Vakil, H. Saito, "On Congestion Control in ATM Networks," Bellcore Technical Memorandum TM-ARH-019266, May 1991.

W. E. Leland, "Window-Based Congestion Management in Broadband ATM Networks: the Performance of Three Access-Control Policies," Bellcore Technical Memorandum TM-ARH-013122, Apr. 1989.

FIG. 1
PACKET TRANSMISSION SYSTEM

FIG. 2
SWITCHING NODE

FIG. 3
BUFFER UTILIZATION DETECTION

FIG. 4
TRANSMISSTION RATE ADJUSTMENT
BUFFER UTILIZATION TECHNIQUE

FIG. 5

RATE-BASED CONTROL DETECTION

FIG. 6

TRANSMISSION RATE ADJUSTMENT
RATE-BASED CONTROL TECHNIQUE

LINK-BY-LINK CONGESTION CONTROL FOR PACKET TRANSMISSION SYSTEMS

TECHNICAL FIELD

This invention relates to the control of congestion in high speed connectionless networks and, more particularly, to the local control of congestion in such networks based on local traffic conditions.

BACKGROUND OF THE INVENTION

In high speed connectionless networks such as packet transmission networks, or other networks not using dedicated transmission facilities, high traffic loads often result in extensive delays between packet transmissions. Such delays can actually decrease the overall throughput of the network. This phenomenon is known as congestion. Data packets arriving at a switching node in a congested system find no available buffer space and hence must be discarded and retransmitted at a later time. Such discard and retransmission, in turn, further increases the traffic load on the system, causing the congestion condition to further degenerate. Increased geographic separation of the ports on the network increases round trip delay of messages on the network, further accentuating the congestion control problem. Moreover, even on shorter round trips, large bandwidths increase the number of packets in transit, also accentuating the congestion control problem.

Traffic management systems are designed to either avoid traffic congestion or to control such congestion once it has come into existence. It has become common to provide so-called "end-to-end" congestion control. That is, traffic is observed at either the entry point, the exit point, or both, and the rate of transmission adjusted to prevent congestion. While such a strategy may be appropriate for connection-oriented networks, where a connection is set up between the sending and the receiving ports prior to the exchange of messages, such a strategy is not effective for connectionless networks where data packets are switched locally at switching nodes in response to information in the data packet itself. In addition, connection-oriented networks, having at least some transmission facilities exclusively used by a connection, are extremely inefficient for transmitting bursty computer network traffic due to the large overhead cost of setting up the connection and the short holding time for such a connection. Thus, end-to-end congestion control techniques which are viable in connection-oriented networks are not well-suited to connectionless packet networks.

SUMMARY OF THE INVENTION

In accordance with the illustrative embodiment of the present invention, the packet transmission speed between each pair of adjacent switching nodes is adjusted based upon the buffer utilization at the two switching nodes. This technique, which can be called "link-by-link" or link-level congestion control, has the advantage of controlling traffic load only at the points at which congestion occurs or is about to occur. Congestion control in all other parts of the network is not required.

In accordance with one feature of the present invention, buffer utilization at each switching node in the network is used as a measure of congestion. As the buffer utilization rises in each switching node, the traffic sent to that node is reduced, thereby reducing the congestion. Such traffic reduction can be accomplished on a continuous basis, depending on the instant-to-instant population in the congested switch buffer, or by establishing one or more thresholds of buffer utilization. In the latter case, traffic to the congested switching node is altered in steps in response to buffer utilization crossing such thresholds. Traffic control messages are exchanged between adjacent switching nodes to implement the traffic adjustments.

In accordance with another feature of the present invention, the traffic flowing into the congested switching node is adjusted in response to the *relative* traffic loads at the two adjacent switching nodes, thereby avoiding the creation of worse congestion at one node in order to reduce congestion at a neighboring node.

In accordance with yet another feature of the present invention, transmission of packets between adjacent switching nodes is never turned off completely. Such a complete shutdown of traffic can lead to a deadlock condition where two adjacent nodes can relieve their congestion only by transmitting to each other.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
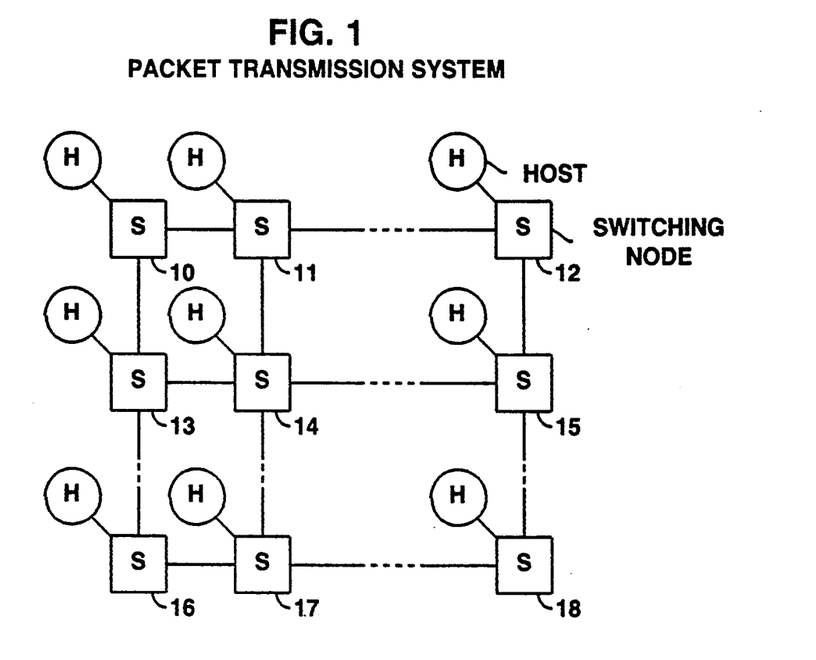
FIG. 1 shows a general block diagram of a packet transmission system comprising a plurality of switching nodes and in which the traffic congestion control techniques of the present invention can be used.
Figure 2:
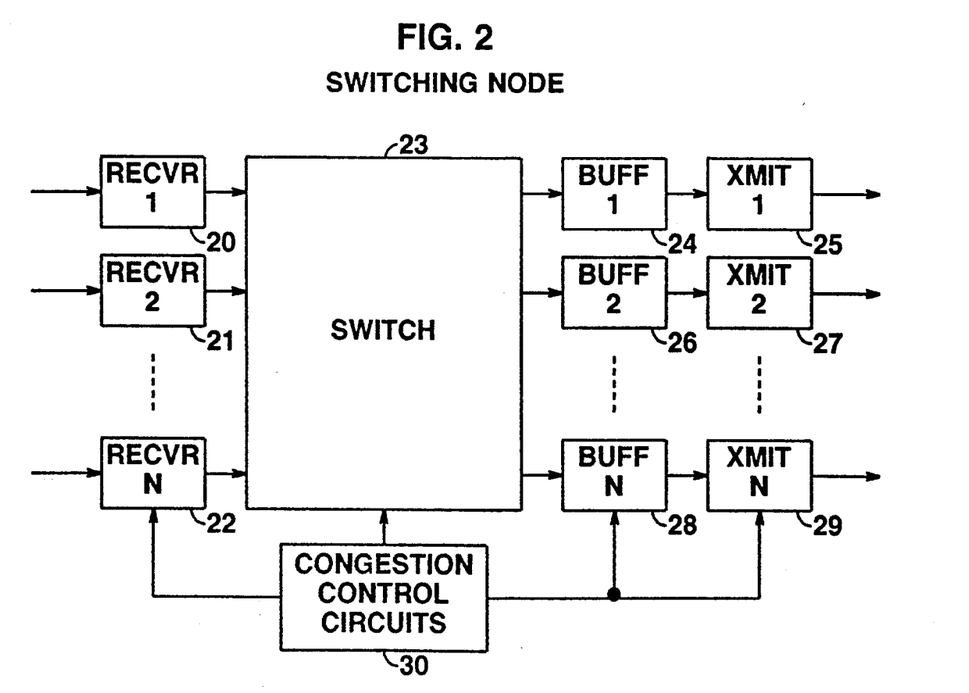
FIG. 2 shows a more detailed block diagram of one switching node of the system of FIG. 1 showing the congestion control circuits of the present invention.

In FIG. 1 there is shown a general block diagram of a packet transmission system comprising a plurality of switching nodes 10 through 18 arranged in FIG. 1 in a two-dimensional lattice. Nodes 10–18 may, however, be arranged in any connected graph arrangement, each node having a plurality of incoming communication lines and a plurality of outgoing communication lines, the two pluralities not necessarily being equal. Each of nodes 10–18 is associated with a host computer which performs all of the storage and control functions necessary to operate the switch. Each of nodes 10–18, with the assistance of its respective associated host computer, is able to switch a data packet from any of the incoming communications lines to any of the outgoing communication lines. One such switching node is shown in FIG. 2.

In packet transmission systems like that shown in FIG. 1, end-to-end connections through the transmission system are *not* established. Indeed, no fixed connections whatsoever are established prior to the receipt of a message for transmission on the system. Instead, each link in the path through the transmissions system is set up as the packet arrives at a switching node in the system, in response to destination data contained in the data packet itself. Incoming data packets are stored in buffer registers until the outgoing transmission link becomes available for packet transmission. In such data packet transmission systems, overloading manifests itself as packet congestion at particular switching nodes where excessive traffic is being routed. If congestion occurs, buffers can overflow and packets can be lost, requiring retransmission or causing message corruption.

In many prior art transmission systems, the problem of congestion has been solved by limiting the amount of traffic which is launched on the transmission system. Such end-to-end congestion control therefore can only become active *after* the congestion has already occurred. If the number of lost packets which must be retransmitted is above a threshold, the congestion can increase rather than decrease, even though no new traffic is launched on the system.

In accordance with the present invention, congestion in the packet transmission system of FIG. 1 is controlled by monitoring the packet traffic between each pair of directly connected ones of switching nodes 10–18. The speed of transmission between these two nodes is then adjusted to reduce congestion in the receiving node of the two connected nodes. In one embodiment, the speed of transmission to a node is altered each time the buffer occupancy changes, thus continuously tracking the traffic load. In another embodiment, the speed of transmission is altered in response to the *relative* traffic loads at the two nodes, and in predetermined steps.

In FIG. 2 there is shown a more detailed block diagram of one of the switching nodes 10–18 in accordance with the present invention. The switching node of FIG. 2 comprises a plurality of incoming communication lines terminating in data receivers 20–22, respectively. The outputs from receivers 20–22 are fed into a switch 23 capable of connecting any one of the receivers 20–22 to any one of buffer registers 24, 26, . . . , 28. Registers 24, 26, 28 are designed to store a plurality of data packets received by receivers 20–22 and to feed these data packets, one at a time and in the order received, to corresponding transmitters 25, 27, . . . , 20. Each of transmitters 25, 27, 29, in turn, transmits data packets to particular ones of other switching nodes 10–18 of the transmission system of FIG. 1. All of the components of FIG. 2 are under the control of a host computer including congestion control circuits 30. More particularly, buffers 24, 26, 28 are monitored by congestion control circuits 30 while transmitters 25, 27, 29 are controlled by congestion control circuits 30.

In general, congestion control circuits 30 monitor the traffic load at the switching node of FIG. 2 by measuring the buffer utilization of buffer registers 24–28. Changes in buffer utilization for a particular transmission link (particular one of transmitters 25–29) are reported to the associated neighboring switching node to be used to control the rate of transmission of data packets from that node to another node. The buffer utilization can be reported continuously for each new packet arriving at a buffer, or can be reported discretely whenever the buffer utilization crosses one of a plurality of preselected buffer utilization thresholds. The neighboring switching node can compare the reported buffer utilization to the buffer utilization of the neighbor back to the sending node. Transmission speed can then be adjusted based on the relative buffer utilizations.

Alternatively, each switching node can monitor both the buffer utilization for a particular immediate neighbor and also monitor the traffic arriving from the same particular immediate neighbor. Using this information, the monitoring switching node can calculate an appropriate transmission rate for that particular neighbor and transmit the desired transmission rate to the neighbor by a message packet launched on the transmission link to that neighbor. The neighboring node can then adjust its transmission rate accordingly. In any case, each switching node must separately and simultaneously monitor the traffic with each of the immediately neighboring switching nodes, and transmit appropriate transmission rate modifying messages to each of such immediately neighboring switching nodes at the appropriate times. Such activities are most readily carried out in a programmed computer and hence would typically take place in the host computers associated with each of the switching nodes 10–18 of FIG. 1. Detailed flow charts of the necessary processes taking place in these host computers are shown in FIGS. 3 through 6. More detailed explanations of the operation of the flow charts of FIGS. 3–6 and pseudo code for the processes of these flow charts are shown in the attached Appendix.

Figure 3:
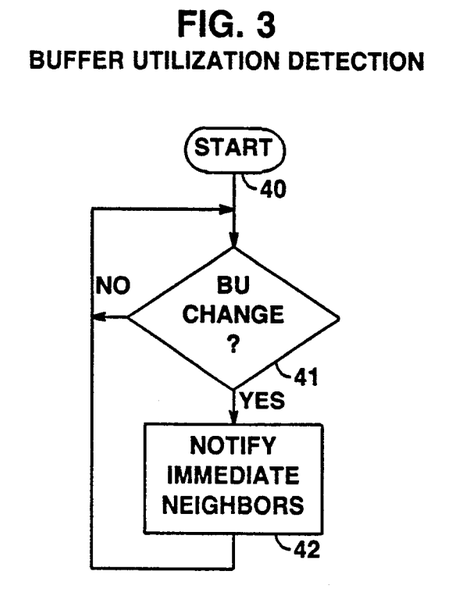
FIG. 3 shows a flow chart of a process for continuously detecting the buffer utilization changes at the switching node of FIG. 2 to accomplish link-by-link congestion control in accordance with the present invention.

Referring more particularly to FIG. 3, there is shown a flow chart of a process for detecting buffer utilization at each of the switching nodes for each connected outgoing transmission link at that switching node. Starting in box 40, decision box 41 is entered where the buffer utilization is monitored. If the buffer utilization does not change, decision box 41 is re-entered to continue monitoring for buffer utilization changes. If the buffer utilization *does* change, box 42 is entered to generate and launch a message to the appropriate immediate neighbor notifying that immediate neighbor of the change in buffer utilization. The buffer utilization messages must be sent without delay and hence have the highest possible priority rating. Decision box 41 is then re-entered to continue the monitoring process.

Buffer monitoring box 41 can monitor continuously, reporting every change in buffer utilization caused by the arrival or departure of every single packet to and from buffers 24–28 of FIG. 1, or can establish buffer utilization thresholds and report only when the net occupancy of the buffer registers 24–28 crosses one or more preselected thresholds. Moreover, the thresholds set for increasing buffer occupancy need not be the same as the thresholds for decreasing buffer occupancy to avoid instabilities at the threshold levels.

Figure 4:
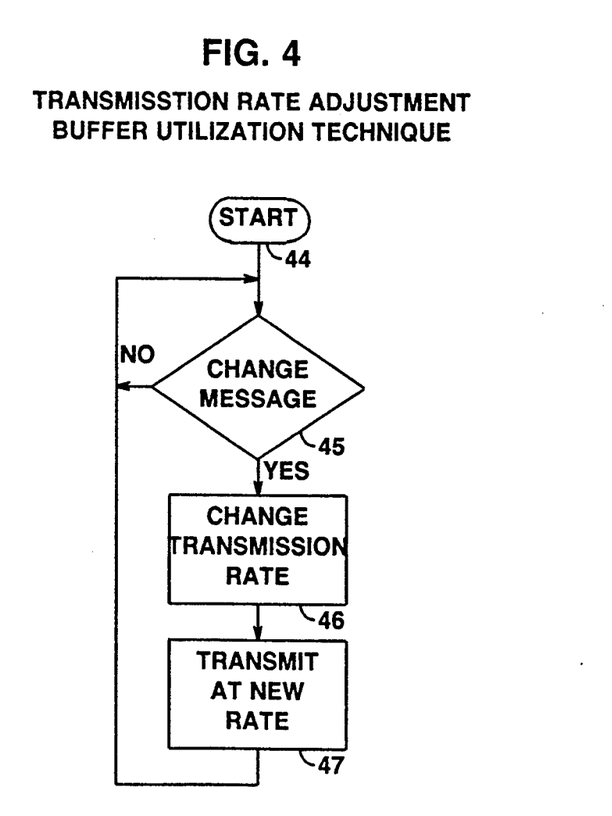
FIG. 4 shows a flow chart of the process in the switching nodes adjacent to the switching node monitored by the process of FIG. 3 for adjusting the transmission speed to the node monitored by the process of FIG. 3 in response to buffer utilization change messages.

In FIG. 4 there is shown a flow chart of the process used at the immediate neighbor to adjust transmission rate in response to the messages launched by the flow chart of FIG. 3. Starting in box 44 of FIG. 4, decision box 45 is entered to determine if a new buffer utilization rate message has been received from a particular immediate neighbor "X." If not, box 45 is re-entered to continue the monitoring process. If a new buffer utilization rate message has been received from neighbor "X," box 46 is entered to compare the buffer utilization measured at the local node to the buffer utilization reported by the message-originating node "X." Changes in the transmission rate for data packets being transmitted to neighbor "X" are made in response to the relative transmission rates. That is, if the buffer utilization at the local node is greater than or equal to the buffer utilization at the message-originating node "X," then the local node transmits data packets to the neighbor "X" at full speed. If, however, the buffer utilization at the local node is less than the buffer utilization at the message-originating node "X," then the local node transmits to "X" at the rate:

$$f\left(\frac{BU_S}{BU_X}\right) \times \text{fullspeed} \quad (1)$$

where $BU_S$ and $BU_X$ are the buffer utilizations at the local node and the node "X," respectively, and f is a weighting function designed to gradually increase the transmission rate to fullspeed as $BU_S$ and $BU_X$ approach each other.

Box 47 is then entered to begin transmitting packets to neighbor "X" at the new rate. Thereafter, box 45 is re-entered to continue monitoring for new buffer utilization rate messages which might require further changes in the packet transmission rate of "X."

It can be seen that the congestion control process implemented in the flow charts of FIGS. 3 and 4 are based upon the algorithm of each switching node monitoring the buffer utilization for traffic destined for each immediate neighbor, and transmitting buffer utilization messages to those immediate neighbors when the buffer utilization changes. Such changes are reported either continuously for each arriving and departing data packet, or are reported at discrete times when the buffer utilization crosses one of a number of preselected utilization thresholds. In either case, the immediate neighboring switching node adjusts the transmission rate to the message-originating node, not simply in response to the received buffer utilization, but in response to the *relative* buffer utilization for the two connected nodes.

Figure 5:
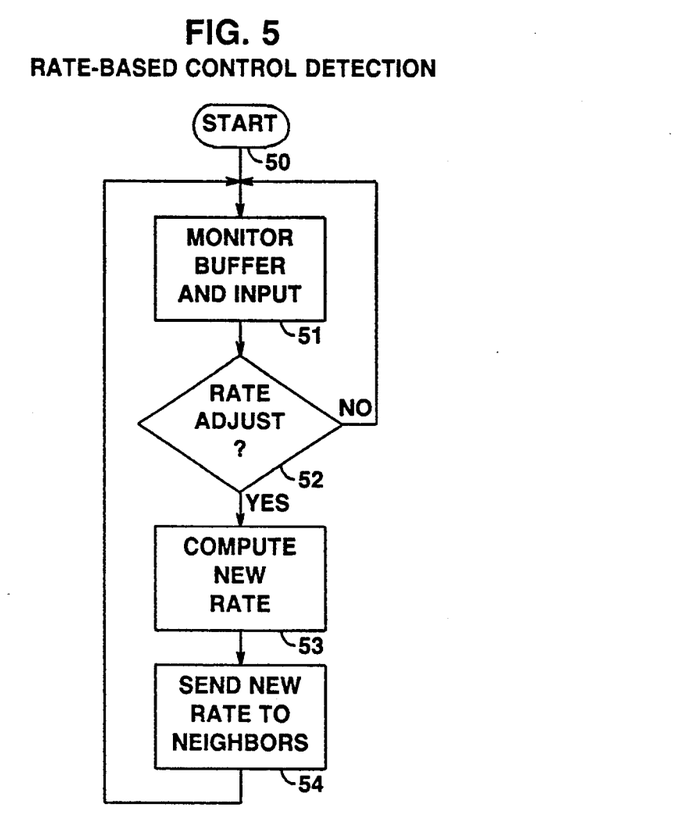
FIG. 5 shows a flow chart of a process for monitoring both the buffer utilization and the input traffic from an adjacent node in order to calculate a new rate of transmission for that adjacent node.

In FIG. 5 there is shown a flow chart of a rate-based congestion control system in which each switching node calculates the appropriate transmission rate for each of its immediate neighbors and transmits that rate to the immediate neighbors for execution. This is accomplished, in general, by using the buffer utilization at a first node as a measure of the traffic to a second node, and measuring the traffic input at the first node from the second node directly. In FIG. 5, beginning at box 50, box 51 is entered to monitor both the buffer utilization and the traffic input from the various immediate neighbors. More particularly, if time is divided into time frames $t_0, t_1, \ldots$, S is a switching node, X is an immediately neighboring node to S and $B_X[S,i]$ is the buffer utilization of node X known by node S at the end of time frame $f_i$. On the other hand, $Y_X[S,i]$ is the input rate of data packets to node S from node X during the same time frame $f_i$. Given these definitions, the output rate for data packets from node S during period $f_i$ (including both those data packets routed by node S to other nodes and those data packets terminating at node S) is given by:

$$OUT_S[i] = \sum_{n \in N_S} X_n[S,i] + D_S[i] \quad (2)$$

where $N_S$ is the set of all immediate neighbors of S.

$X_n[S,i]$ is the number of data packets which S transmits to an immediate neighbor n during $f_i$.

$D_S[i]$ is the number of data packets which terminate as S during $f_i$, i.e., $D_S[i]$ is the number of packets which arrives at S as the final destination during $f_i$.

During the period $f_i$, box 51 of FIG. 5 the node S keeps track of $B_X[S,i]$ and $OUT_S[i]$. At the end of the period $f_i$, the switching node S transmits the value of $B_X[S,i]$ to the neighboring node X.

At the end of the monitoring period $f_i$ decision box 52 is entered to determine if a rate adjustment is required at switching node X. If, at the end of period $f_i$, the buffer utilization $BU_S$ exceeds or falls below a pre-defined threshold value $\tau$, a rate adjustment is necessary and box 53 is entered. If no change in rate is required, box 51 is re-entered to continue monitoring buffer utilization and input traffic for the next period $f_{i+1}$. If, on the other hand, a rate adjustment is required, box 53 is entered to calculate the new rate. If the buffer utilization $BU_S$ exceeds the threshold $\tau$, the new rate $\overline{Y}_X[S]$ is given by $$\overline{Y}_X[S] = r \times OUT_S[i] \times \frac{B_X[S,i]}{\sum_{n \in N_S} B_n[S,i]} \quad (3)$$

where r is a pre-defined reduction rate. $(0 < r < 1)$

That is, the new rate is reduced to a value proportional to the ratio of the buffer utilization of node T known by node S to the summation of the buffer utilizations for all other immediately neighboring nodes likewise known by node S times the total traffic coming into node S ($OUT_S[i]$).

On the other hand, if the buffer utilization $BU_S$ falls below the threshold $\tau$, the new rate can be calculated from $$\overline{Y}_X[S] = \min\left(f_s(1 + \Delta) \times OUT_S[i] \times \frac{B_X[S,i]}{\sum_{n \in N_S} B_n[S,i]}\right) \quad (4)$$

where $\Delta$ is a pre-defined *increment rate* $(\Delta > 0)$, and f s is the full speed (i.e., the bandwidth provided by the layer below).

That is, the new rate is increased to a value proportioned as detailed above, but limited by the full speed transmission rate of the available transmission channel.

Equations (3) and (4) are valid only if there are data packets waiting to be transmitted toward node S, i.e., only if $$\sum_{n \in N_S} B_n[S,i] \neq 0. \text{ If } \sum_{n \in N_S} B_n[S,i] = 0$$

and the buffer utilization at S exceeds $\tau$, the new transmission rate is given by $$\overline{Y}_X[S, i+1] = r \times OUT_S[i] \times \frac{Y_X[S,i]}{\sum_{n \in N_S} Y_n[S,i]} \quad (5)$$

If, on the other hand, $$\sum_{n \in N_S} B_n[S,i] = 0$$

and the buffer utilization at S falls below $\tau$, the new transmission rate is given by $$\overline{Y}_S[S, i+1] = \min\left[ f_S(1+\Delta) \times OUT_S[i] \times \frac{Y_X[S,i]}{\sum_{n \in N_S} Y_n[S,i]} \right] \quad (6)$$

If no data is destined for node S, the rate is, of course, set at full speed. Once the new rate is transmitted in box 53, that new rate is sent to the appropriate immediate neighbor in box 54. Again, the new rate message carries the highest priority so that it is transmitted immediately without delay or queuing. Thereafter, box 51 is re-entered to continue the monitoring process.

Figure 6:
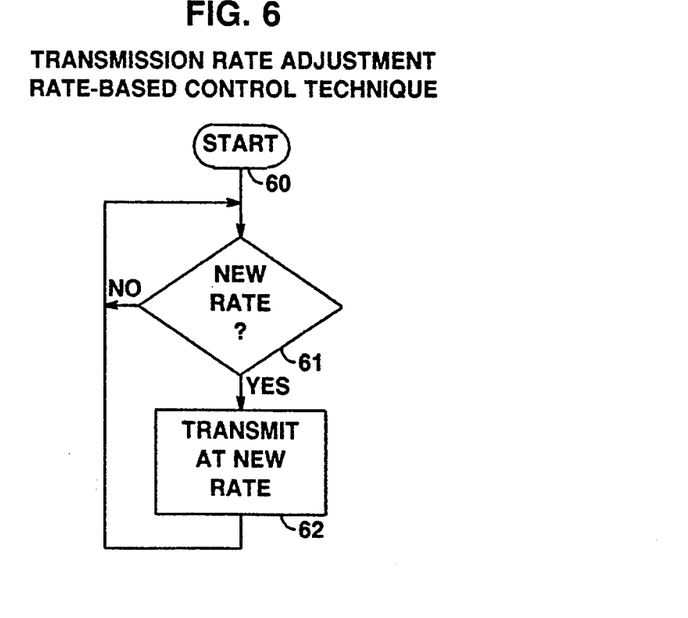
FIG. 6 shows a flow chart of the process for adjusting the transmission rate at the switching node adjacent to that monitored by the process of FIG. 5.

In FIG. 6 there is shown a flow chart of the transmission rate adjustment process taking place at the immediate neighbors of the node executing the process of FIG. 5. Starting in start box 60, decision box 61 is entered to determine if a new transmission rate message has been received. If not, decision box 61 is re-entered to continue to wait for new transmission rate messages. If a new transmission rate message has been received, box 62 is entered to initiate transmission to the message-originating node at the new transmission rate. Box 61 is then re-entered to await the arrival of the next transmission rate message.

It can be seen that the two embodiments of the invention, the buffer utilization embodiment of FIGS. 3 and 4 and the rate based embodiment of FIGS. 5 and 6, both utilize a comparison of the traffic flowing between two adjacent nodes to adjust the transmission rate of data packets between the nodes. This local link-level congestion control system is far superior to end-to-end congestion control systems of the prior art because control actions take place in anticipation of congestion rather than in response to congestion. In addition, the local link-level congestion control is more responsive to moment-to-moment changes in congestion than are end-to-end control schemes. Furthermore, such link-level control is much more suitable for the bursty type computer traffic where the durations of data transmissions are relatively short.

It should also be clear to those skilled in the art that further embodiments of the present invention may be made by those skilled in the art without departing from the teachings of the present invention.

APPENDIX
PSEUDO CODE
RELATIVE BUFFER UTILIZATION ALGORITHM

Assumptions:
1. S=A monitored crosspoint switching node.
2. X=An immediate neighbor switching node to S.
3. Switch S has a plurality of Buffers (BUFF_S) having n utilization levels:

$BU_1, BU_2, \ldots, BU_n (BU_1 > BU_2, \ldots, BU_{n-1} > BU_n)$.

---

MONITORING PROCESS A - DISCRETE VERSION
repeat
    BUFF_S utilization level changes ($BU_i \rightarrow BU_{i\pm 1}$)
    report level to $X_1, \ldots, X_m$
        where m is the number of immediate neighbors X.
forever MONITORING PROCESS B - CONTINUOUS VERSION
repeat
    packet arrives/departs (BUFF_S utilization level changes)
    report change to $X_1, \ldots, X_m$
forever TRANSMISSION SPEED CONTROL PROCESS
repeat
    new buffer utilization value arrives from S
        compare $BU_X$:$BU_S$
        if $BU_X \geq BU_S$
            then transmit to S at full speed
        if $BU_X < BU_S$ $$\text{then transmit S at } f\left(\frac{BU_S}{BU_X}\right) \times \text{full speed}$$

where f is a weighting function designed to gradually increase the transmission rate as the buffer utilization values approach each other
forever

---

RATE-BASED CONTROL ALGORITHM

Assumptions:
1. Time is divided into time frames $t_0, t_1, \ldots$, where $f_i$ is ith time frame in the succession of time frames marked by $t_1, t_2, \ldots$.
2. S is a cross point switching node.
3. X is an immediately neighboring switching node to S.
4. $B_X[S,i]$ is the *buffer utilization* of X known by S at the end of $f_i$.

This is the number of data packets waiting to be transmitted by X to S, as known by S, at the end of $f_i$.

5. $Y_X[S,i]$ is the *input rate* of S from X during $f_i$. This is the number of data packets which S receives from X during $f_i$.
6. $OUT_S[i]$ is the *output rate* of S during $f_i$. This is the number of data packets which terminate at S or are routed by S to other switches during $f_i$. More precisely, $$OUT_S[i] = \sum_{n \in N_S} X_n[S,i] + D_S[i]$$

where
$N_S$ denotes the set of immediate neighbors of S.
$X_n[S,i]$ denotes the number of data packets which S transmits to an immediate neighbor n during $f_i$.
$D_S[i]$ denotes the number of data packets which terminate as S during $f_i$, i.e., $D_S[i]$ is the number of packets which arrives at S as the final destination during $f_i$.

---

OUTPUT RATE AND BUFFER UTILIZATION MONITORING PROCESS
repeat
    during $f_i$, S keeps track of $B_X[S,i]$ and $OUT_S[i]$
    at the end of $f_i$, S reports $B_X[S,i]$ to X
forever
INPUT RATE CONTROL PROCESS
repeat -continued at the end of $f_i$, S computes and transmits the new acceptable
input rate for X, denoted by $\overline{Y}_X[S]$ as follows:
   if S's buffer utilization exceeds a pre-defined threshold $\tau$
   then $$\overline{Y}_X[S] = r \times OUT_S[i] \times \frac{B_X[S,i]}{\sum_{n \in N_S} B_n[S,i]}$$

where
      r is a pre-defined reduction rate. $(0 < r < 1)$
   if S's buffer utilization falls below $\tau$
   then $$\overline{Y}_X[S] = \min\left( f_{s,}(1 + \Delta) \times OUT_S[i] \times \frac{B_X[S,i]}{\sum_{n \in N_S} B_n[S,i]} \right)$$

where
      $\Delta$ is a pre-defined increment rate $(\Delta > 0)$, and
      fs is the full speed (i.e., the bandwidth provided
      by the layer below).
forever
NOTE 1: The input rate reduction will be repeatedly reduced if
the buffer utilization of S continuously exceeds the threshold $\tau$.
Similarly, the rate will be repeatedly increases if the buffer
utilization of S continuously falls below $\tau$, until the rate exceeds
the full speed.
NOTE 2: The above formulae are valid only when $\sum_{n \in N_S} B_n[S,i] > 0$; that is, there are packets waiting to be transmitted toward S at the end of
$f_i$. In the case that $\sum_{X \in N_S} B_X[S,i] = 0$, the following formulae are applied instead:

if $\sum_{n \in N_S} Y_n[S,i] > 0$ and S's buffer unitization exceeds $\tau$    then $$\overline{Y}_X[S, i + 1] = r \times OUT_S[i] \times \frac{Y_X[S,i]}{\sum_{n \in N_S} Y_n[S,i]}$$

if $\sum_{n \in N_S} Y_n[S,i] > 0$ and S's buffer utilization falls below $\tau$    then $$\overline{Y}_X[S, i + 1] = \min\left[ f_{s,}(1 + \Delta) \times OUT_S[i] \times \frac{Y_X[S,i]}{\sum_{n \in N_S} Y_n[S,i]} \right]$$

if $\sum_{n \in N_S} Y_n[S,i] = 0$ then
      S allows all X's to transmit packets to S at full speed,
      i.e., $\overline{Y}_X[S, i + 1]$ = the full speed
TRANSMISSION SPEED CONTROL PROCESS
X allows data packets to be transmitted to S at the full speed
(i.e., the bandwidth provided by the layer below).
repeat
   Whenever a new acceptable input rate $\overline{Y}_X[S]$ arrives from S,
   X allows data packets to be transmitted to S at the rate
   $\overline{Y}_X[S]$].
forever

What is claimed is:

1. A packet transmission system comprising
   a plurality of packet switching nodes interconnected by transmission links between pairs of switching nodes,
   monitoring means at each of said nodes for monitoring the traffic intended for each other of said nodes, and
   adjusting means at each of said nodes responsive to said monitoring means at two adjacent nodes for adjusting the transmission rate for packets transmitted between said two adjacent nodes.

2. The packet transmission system according to claim 1 further comprising
   buffering means at each of said switching nodes for buffering data packets intended for transmission to each neighboring switching node connected by one of said transmission links,
   said monitoring means comprising means for measuring the buffer utilization factor for said buffering means.

3. The packet transmission system according to claim 2 further comprising
   means for reporting the crossing of any one of a plurality of preselected thresholds in occupancy of said means for buffering for one neighboring node to said one neighboring node.

4. A method for controling congestion in a packet transmission system comprising the steps of
   interconnecting a plurality of packet switching nodes by transmission links between pairs of said switching nodes,
   monitoring at each of said nodes the traffic intended for each other of said nodes, and
   in response to the relative monitored traffic between two adjacent nodes, adjusting the transmission rate for packets transmitted between said two adjacent nodes.

5. The method according to claim 4 further comprising the step of
   buffering, at each of said switching nodes, data packets intended for transmission to each neighboring switching node connected by one of said transmission links.
   said step of monitoring comprising the step of measuring the buffer utilization factor during said buffering step.

6. The method according to claim 5 further comprising the step of
   reporting every execution of said buffering step to at least one neighboring node.

7. The method according to claim 5 further comprising the step of
   reporting the crossing of any one of a plurality of preselected thresholds in the number of data packets simultaneously buffered in said buffering step to at least one neighboring node.

8. The method according to claim 12 further comprising the step of
   measuring, at said each of said switching nodes, the traffic arriving from each respective neighboring node.

9. The method according to claim 6 further comprising the step of
   utilizing a transmission rate from the node S to the adjacent node X given by $$f\left(\frac{BU_S}{BU_X}\right) \times \text{fullspeed}$$

where $BU_S$ is the buffer utilization of a node S, $BU_X$ is the buffer utilization of an adjacent node X, f is a weighting function designed to gradually increase the transmission rate to full speed as $BU_S$ and $BU_X$ approach each other, and fullspeed is the maximum transmission rate from node S to node X.

10. The method according to claim 8 further comprising the step of utilizing a transmission rate $\overline{Y}_X(S,i)$ from the node X to the adjacent node S given by $$\overline{Y}_X(S,i) = r \times OUT_S(i) \times \frac{B_X(S,i)}{\sum_{n \in N_S} B_n(S,i)}$$

where

S is one of said switching nodes,

X is an immediate neighbor switching node to node S, $B_X(S,i)$ is the buffer utilization of node X reported to node $\overline{Y}_X(S,i)$ is the rate of transmission from node X to node S, and $OUT_S(i)$ is the output rate from node S, where $$OUT_S(i) = \sum_{n \in N_S} X_n(S,i) + D_S(i),$$

where $N_S$ is the set of all immediate neighbors of S, $X_n(S,i)$ is the number of data packets which S transmits to an immediate neighbor n during $f_i$, $f_i$ is a fixed period of time in a succession of periods of time having an index i, $D_S(i)$ is the number of data packets which terminate as S during $f_i$, i.e., $D_S(i)$ is the number of packets which arrives at S as the final destination during $f_i$, and r is a pre-defined reduction rate between zero and one.

11. The method according to claim 8 further comprising the step of utilizing a transmission rate $\overline{Y}_X(S,i)$ from the node X to the adjacent node S given by $$\overline{Y}_X(S,i) = \min\left(f_s(1 + \Delta) \times OUT_S(i) \times \frac{B_X(S,i)}{\sum_{n \in N_S} B_n(S,i)}\right)$$

where

S is one of said switching nodes,

X is an immediate neighbor switching node to node S, $B_X(S,i)$ is the buffer utilization of node X reported to node $\overline{Y}_X(S,i)$ is the rate of transmission from node X to node S, and $OUT_S(i)$ is the output rate from node S, where $$OUT_S(i) = \sum_{n \in N_S} X_n(S,i) + D_S(i),$$

where $N_S$ is the set of all immediate neighbors of S, $X_n(S,i)$ is the number of data packets which S transmits to an immediate neighbor n during $f_i$, $f_i$ is a fixed period of time in a succession of periods of time having an index i, $D_S(i)$ is the number of data packets which terminate as S during $f_i$, i.e., $D_S(i)$ is the number of packets which arrives at S as the final destination during $f_i$, $\Delta$ is a pre-defined increment rate greater than zero, and fs is the maximum available transmission rate from node X to node S.

* * * * *